Oct. 8, 1963
A. K. SHONE
3,106,232
SAW CHAIN AND TOOTH THEREFOR
Filed April 4, 1960
2 Sheets-Sheet 1
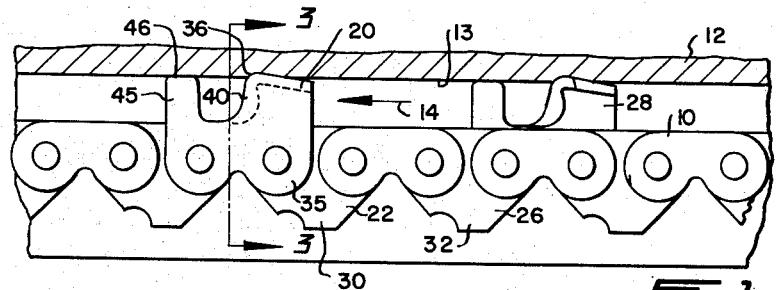
Fig. 1. PRIOR ART
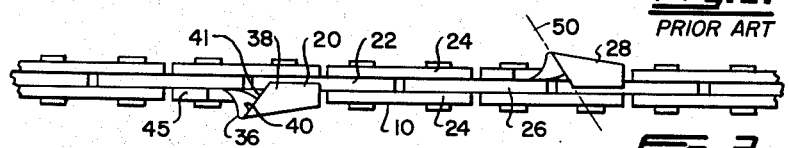
Fig. 2. PRIOR ART
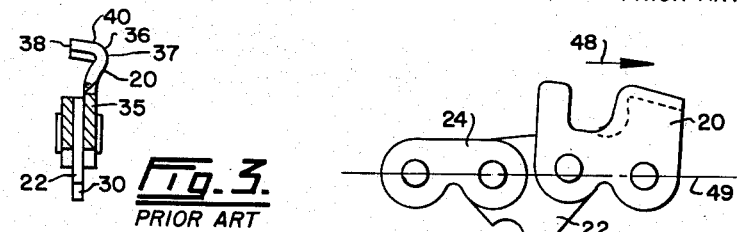
Fig. 3. PRIOR ART   Fig. 4. PRIOR ART
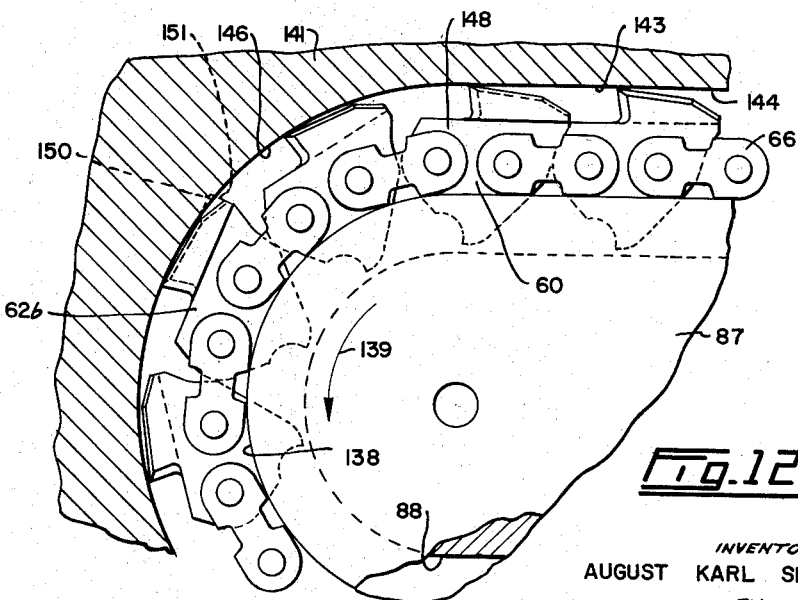
Fig. 12.
INVENTOR
AUGUST KARL SHONE
BY Featherstonhaugh & Co.
ATTORNEYS Oct. 8, 1963 A. K. SHONE 3,106,232
SAW CHAIN AND TOOTH THEREFOR
Filed April 4, 1960 2 Sheets-Sheet 2
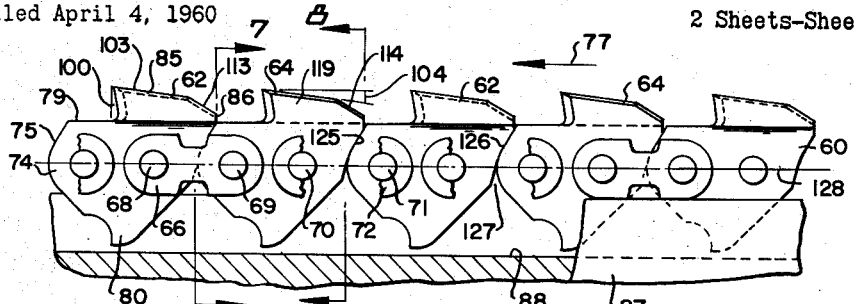
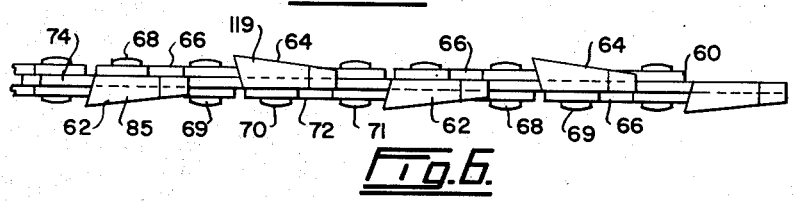
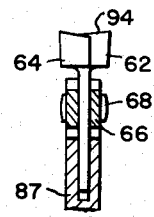 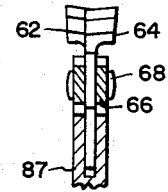
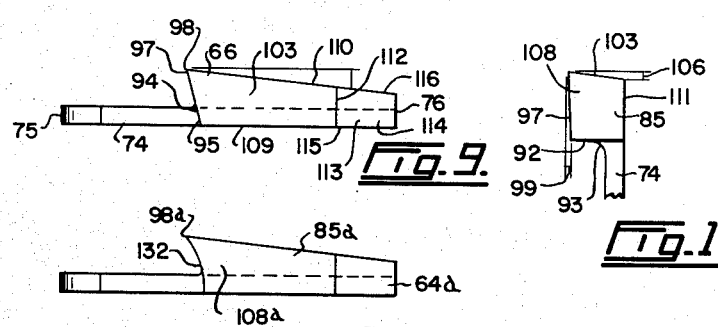
INVENTOR
AUGUST KARL SHONE
BY
Featherstonhaugh & Co.
ATTORNEYS

United States Patent Office 3,106,232
Patented Oct. 8, 1963

3,106,232
SAW CHAIN AND TOOTH THEREFOR
August Karl Shone, Vancouver, British Columbia, Canada, assignor to Rex Chain-Saw Ltd., Vancouver, British Columbia, Canada, a corporation of British Columbia
Filed Apr. 4, 1960, Ser. No. 19,593
4 Claims. (Cl. 143—135)

This invention relates to cutting chains for power saws, and to cutting teeth for said chains.

This application is a continuation-in-part of my application, filed February 17, 1958, Serial Number 715,613, now abandoned.

Power saw chains now generally on the market are of such construction that the cutting teeth thereof are spaced comparatively far apart. This limits the number of cutting teeth in the chain for a saw of a given size, thereby limiting the speed at which the chain can cut through wood. Each tooth cuts the wood along the side of a kerf formed by the cutting action and part way across the bottom of said kerf. The next following tooth cuts the wood on the opposite side of said kerf and part way across the bottom thereof. The type of cutter tooth now in most common use presents a comparatively long cutting edge to the wood in the direction of movement of the tooth. This cutting edge is the first part of the tooth that enters the wood, and most of the edge enters the wood at the same time. The movement of these teeth through the wood results in considerable friction, thereby wasting a large percentage of the power available. Furthermore, the friction generates sufficient heat to affect the temper of the cutting teeth. Another disadvantage of the prior chains is that they must be sharpened by means of cylindrical files, and this requires considerable skill in order to obtain satisfactory results.

A further disadvantage of the saw chains in common use is that they require depth gauges in order to prevent the cutting teeth from "cocking" or tending to swing outwardly relative to the direction of movement of the chain. These depth gauges ride along the bottom of the kerf, and there is one ahead of each cutter so that it controls the depth of the cut made by its cutter.

A saw chain incorporating the teeth of the present invention results in a smooth cutting action in the wood, thereby reducing friction. It is well known that the chains on the market make a rough cut through the wood which would seem to indicate that a lot of the wood is torn out instead of being cut out. On the other hand, the present chain makes a very smooth cut, thereby indicating that the wood particles are properly cut away from the remainder of the wood. The cutter teeth are so formed and arranged that they move all of the sawdust ahead of them out of the kerf. Furthermore, these teeth do not require depth gauges and this, along with the construction of the teeth, makes it possible to position the teeth closer together than has heretofore been possible. Two or three times as many teeth may be inserted in a chain of a given length as is possible with the chains now on the market. Furthermore, the present teeth may be sharpened by a flat file without any special skill.

Another advantage of the present invention lies in the fact that the cutter teeth are so shaped that they can cut wood while moving around the curved outer end of a cutter bar without digging in or chattering, thereby making it possible to use the chain saw for boring, that is, for cutting into wood in the longitudinal direction of the saw cutter bar.

In the preferred form of the invention, the cutter teeth of the chain immediately follow each other. The adjacent ends of the cutter teeth bodies are so shaped and located relative to each other as to abut in a way to prevent cocking of the cutter teeth while permitting said teeth to travel around drive sprockets and the ends of cutter bars. Furthermore, each cutter tooth presents a point to the wood in the direction of movement of the chain. In other words, a point first enters the wood, and the main cutting edges of the teeth always enter at an angle to the direction of movement. This may be likened to sawing a piece of wood with a hand saw. It is usually easier if the saw cuts at an acute angle to the general direction of movement of the blade through the wood rather than straight across said direction of movement.

A preferred tooth according to the present invention includes a substantially flat body having forward and rear edges with reference to the direction of movement of the tooth when in operation and an outer edge extending between said forward and rear edges, a long solid cutting element on and projecting from the body outer edge, said cutting element extending outwardly and spreading laterally on one side only of the body and extending forwardly from near the rear edge of the body in a direction towards the forward edge thereof and to a substantially transverse cutting edge located outwardly from the body, said cutting edge extending from a point outwardly of the body at one side of the latter across the plane of said body to a leading point on the other side of the body spaced laterally therefrom, and an outer side cutting edge formed on the cutting element extending from said leading point generally towards the body and spaced laterally therefrom, the cutting element adjacent the transverse cutting edge being wide enough to project beyond a side of a cutter bar when the chain of which the tooth forms part is mounted on said bar, said cutting element having a flat outer surface on the outer end thereof forming inner and outer edges extending longitudinally of said element at the sides thereof and rearwardly from the ends of the transverse cutting edge, said flat outer surface extending rearwardly from the transverse cutting edge and terminating short of the rear edge of the body to form a notch in the cutting element at the rearward end thereof, and said flat outer surface being inclined inwardly in a transverse direction from the outer longitudinal cutting edge on the same side of the body as the side cutting edge thereof.

These cutting teeth are arranged in pairs in the improved saw chain. The side cutting edge of each tooth is positioned on the opposite side of the chain from the side cutting edge of the other tooth of the pair. As previously stated, it is preferable to have each cutter tooth immediately followed by another cutting tooth. The adjacent ends of the cutter teeth are so positioned and shaped as to abut against each other to prevent each cutter tooth from swinging outwardly relative to the saw chain, while permitting said teeth to swing inwardly thereof. This inward swinging action is necessary in order to enable the saw chain to travel around sprockets and the ends of cutter bars.

Examples of this invention are illustrated in the accompanying drawings, in which, FIGURE 1 is a side elevation of a prior art saw chain diagrammtically illustrated in a kerf in a piece of wood, said chain being shown upside down for the sake of clarity.

FIGURE 2 is a view looking down on the top of the chain of FIGURE 1,

FIGURE 3 is a vertical section through the chain alone taken on the line 3—3 of FIGURE 1, FIGURE 4 diagrammatically illustrates the cocking tendency in the chain of FIGURE 1, FIGURE 5 is a side elevation of a saw chain, illustrating a preferred form of the present invention, FIGURE 6 is a plan view of the chain of FIGURE 5, FIGURE 7 is a vertical section taken substantially on the line 7—7 of FIGURE 5, FIGURE 8 is a vertical section taken substantially on the line 8—8 of FIGURE 5, FIGURE 9 is an enlarged diagrammatic plan view of a cutter tooth of the type illustrated in FIGURE 5, FIGURE 10 is an enlarged diagrammatic front view of the tooth shown in FIGURE 9, FIGURE 11 is a view similar to FIGURE 9 of an alternative form of cutter tooth, and FIGURE 12 diagrammatically shows the chain of FIGURE 5 travelling around the curved outer end of a cutter bar, illustrating an advantage of the cutter tooth of this chain.

Referring to the drawings, FIGURES 1 to 3 illustrate a representative saw chain 10 now on the market and belonging to the prior art. This chain is shown in a kerf 11 in a piece of wood 12, said kerf having a bottom 13. The chain, when cutting, moves in the direction indicated by arrow 14.

Chain 10 is made up of several similar sequences of teeth and links. Each sequence includes a cutter tooth 20 on one side of the chain, a centre link 22, spaced side links 24, another centre link 26, and another cutter tooth 28 on the opposite side of the chain from cutter tooth 20. These teeth and links are pivotally secured together by means of rivets in the usual manner. Centre links 22 and 26 have inwardly projecting lugs 30 and 32 relative to the chain. These lugs fit between teeth in the drive sprocket around the cutter bar of the chain saw, not shown, with which the chain is used. The cutter teeth 20 and 28 are the same, excepting that they are made for opposite sides of chain 10 and, therefore, only one, namely, tooth 20, will be referred to in detail. This tooth is made up of a flat body 35 with a cutter 36 projecting outwardly therefrom. The cutter is curved outwardly and back at 37 to project laterally from the tooth body. The cutter also has an inwardly extending portion 38 that is substantially flat and extends from the curved portion to the opposite side of the tooth body, see FIGURE 3. This cutter is also formed with a cutting edge 40 that extends around the curve of portion 37 and across the forward edge of the substantially horizontal portion 38. The section 41 of the cutting edge extending across this horizontal portion is angled rearwardly relative to the direction of movement of the chain, see FIGURE 2. However, by referring to FIGURE 1, it will be seen that the main section of cutting edge 40 extends in a plane lying substantially at right angles to the direction of movement of the chain. Thus, the greater portion of the cutting edge is being moved in a common plane which is normal to the direction of movement of the chain as the cutter is drawn through the wood.

Cutter tooth 20 is formed with a depth gauge 45 projecting outwardly from its forward end substantially in line with cutter 36. The outer end 46 of the depth gauge is a little closer to the main part of the chain than the horizontal portion 38 of cutter 36. This determines the depth of the cut made by said horizontal portion. The outer end of the depth gauge rides along the bottom 13 of the kerf, and it not only controls the depth of the cut made by the cutter portion of the cutter tooth, but it is intended to prevent the tooth from cocking as illustrated in FIGURE 4. If the depth gauge were not there, the force in the direction indicated by arrow 48 against cutter 36 would tend to swing the forward end of the cutter tooth towards the bottom of the kerf and away from the longitudinal centre line 49 extending through the rivets of the chain. Thus, all the chains now on the market include these depth gauges.

The length outwardly of the chain of these depth gauges must always be so maintained that the cutters do not bite too deeply into the wood. If this length is not exactly right, the cutter tends to chip its way along the bottom of the kerf rather than cut cleanly through the wood. Even if the depth gauge is the correct length for its cutter when the tooth is manufactured, this relationship is soon altered under working conditions. Wear on the gauge end and the cutter, and sharpening of the latter upsets this so that it usually takes more power than it should to draw the chain through the wood. The depth gauges are usually filed when the cutters are sharpened, but there is no way of knowing whether the correct relationship is maintained between these parts. In fact, it is well known that the depth gauges are very seldom of the exact correct length after the chain has been used a short time. This erroneous setting is usually noticed only when the difference is so great that the cutters chatter through the wood. The chatter has been known to be sufficient to stall the motor of the chain saw. Furthermore, this creates considerably more friction than necessary often resulting in sufficient heat to affect the temper of the teeth metal.

The prior art cutter teeth are sharpened by means of cylindrical files that are drawn across the forward ends of the curved portions 37 of the cutters 36 at an angle to the direction of movement of the chain and to the transverse plane at said forward ends. This angle is illustrated generally by the line 50 in FIGURE 2.

FIGURES 5 to 10 illustrate a preferred form of chain and cutter tooth therefor according to the present invention. The chain 60 is made up of a plurality of pairs of cutter teeth 62 and 64 placed end to end and connected together by pairs of side links 66. Although one side link only may be used between the teeth, it is usual to provide two links for the purpose. The cutter teeth are located centrally of the chain, and each pair of side links is connected by a rivet 68 to tooth 62 and by a rivet 69 to tooth 64. Tooth 64 is connected by rivets 70 and 71 and side links 72 to the tooth 62 of the next pair of cutters. The cutter teeth 62 and 64 are the same, excepting that one is designed to cut on one side of the chain, while the other is designed to cut on the opposite side thereof.

Cutter tooth 62 consists of a flat body 74 having forward and rear edges 75 and 76 with reference to the direction of movement of the chain, which is indicated by arrow 77. The tooth body has an outer edge 79 extending between the forward and rear edges thereof. A driving lug 80 projects inwardly from the body from the inner edge thereof. This lug may be shaped in any desired manner, as is customary with lugs of this type.

A long cutting element 85 is formed on and projects from the outer edge 79 of body 74. This cutting element extends from 86 near the rear edge 76 of the body in a direction towards the forward edge thereof. The element 85 is solid and projects laterally from the tooth body 74, as clearly shown in FIGURES 7 and 10. In fact, the cutting element is wide enough to project beyond a side of a cutter bar 87, when chain 60 is mounted for operation on said bar. It will be noted that the cutter bar has a groove 88 in its edge in which drive lugs 80 ride.

FIGURES 9 and 10 are very much enlarged diagrammatic plan and front end view of cutting element 85 of tooth 62. These views help clearly to show the cutting edges of this element. FIGURE 10 shows how element 85 projects laterally at 92 from tooth body 74. The connection between the cutting element and body 75 is strengthened by a brace 93, curved in cross section, extending between the element and body. The cutting element extends forwardly relative to the tooth body and spreads laterally towards a substantially transverse cutting edge 94 which is located outwardly from the body. This cutting edge extends from one side of the body at 95 across the plane of said body to an outer cutting edge 97 on the other side of the body spaced laterally therefrom. This side cutting edge extends from a point 98 at its junction with the transverse cutting edge inwardly generally towards the tooth body, as indicated by angle 99 in FIGURE 10. The side cutting edge also extends rearwardly from the point 98, as indicated by angle 100 in FIGURE 5. The forward undercut of the cutting element or angle 100 must range from 4° to 15°. The cutting element also has a flat surface 103 on the outer end thereof extending rearwardly and inwardly from the transverse cutting edge 94. The inward slope of this flat surface is indicated by angle 104 in FIGURE 5, and this must range from 8° to 10°. In addition to this, outer surface 103 is inclined rearwardly and inwardly in a transverse direction from the side of the cutting element which is on the same side of the tooth body as its side cutting edge. This transverse slope of the flat outer surface is indicated by angle 106 in FIGURE 10, angle 106 must range from 5° to 8°. The forward end 108 of the cutting element is flat and lies in a plane which extends obliquely across the cutter tooth and rearwardly from the transverse cutting edge 94 towards the tooth body.

The flat outer surface 103 of the cutting element forms longitudinal inner and outer edges 109 and 110, and flat surface 108 has inner side cutting edge 111. Edges 109 and 110 have leading portions connecting the adjacent edges 94, 97 which are particularly important since edges 94 and 97 and point 98 sever from the bottom of the kerf the piece of the wood which is cut by the cutting element. The cutting element has a flat surface 103 on the outer end thereof forming laterally the inner and outer edges which extend longitudinally of the cutting element at the sides thereof and rearwardly from the ends of the transverse cutting edge.

The outer flat surface 103 of the cutting element extends rearwardly from transverse cutting edge 94 and terminates at 112 short of the rear edge 76 of body 74 to form a notch 113 in cutting element 85. It is preferable to produce the notch by forming the cutting element with a bevel or inwardly- and rearwardly-inclined outer edge 114 which is actually an inwardly-extending continuation of the outer edge of the cutting element. Bevel edge 114 forms inner and outer edges 115 and 116 that are actually continuations of edges 109 and 110, respectively. As stated above, it is preferable to form notch 113 with a bevel between 114, but said notch may be other shapes, if desired.

When cutter tooth 62 is moved towards the wood to be cut, the point 98 is the first thing to enter the wood. This leads the transverse cutting edge 94 and the side cutting edge 97 into the wood. From FIGURES 5, 9 and 10, it will be seen that both of these cutting edges extend obliquely to the direction of travel of the cutter tooth. This greatly reduces the resistance of the wood to the movement of the tooth as compared to cutting edges that are not so arranged.

Cutter tooth 64 is constructed in the same manner as tooth 62, excepting that the element 119 of the former is reversed relative to the cutting element 85 of the latter, that is, element 119 projects from the body of its tooth laterally on the opposite side of saw chain 60, and the various cutting edges are arranged accordingly.

As the bodies of the cutting teeth are aligned in the saw chain and located centrally thereof, the cutting elements of the teeth overlap each other, as clearly indicated in FIGURES 7 and 8. As a result of this, the transverse cutting edges of the teeth overlap so that in effect a continuous cut is made from the tip 98 of one tooth straight across the kerf to the corresponding tip of the other tooth. The outer side cutting edges of the oppositely-arranged teeth cut the wood away along the sides of the kerf. By referring to FIGURES 7 and 8, it will be seen that the solid masses of the cutting elements of the teeth are bound to sweep all the sawdust ahead of them out of the kerf because the mass of each pair thereof completely fills the kerf.

These cutter teeth cut through the wood much easier than the cutter teeth of the prior art in universal use today for several reasons. Some of theses are:

(1) The outer side and transverse edges 110 and 94 of the tooth both extend rearwardly and inwardly from the leading point 98 of the tooth.

(2) The forward part of the cutting element where the cutting takes place is larger than the remainder thereof so that a path is cut to enable the cutting element to move through the wood without undue friction.

The teeth cut through the wood so cleanly that it is possible to place the teeth closer together than is normally done without increasing the amount of power required. By comparing FIGURES 1 and 5, it will be seen that the present cutter teeth follow immediately behind each other, whereas in the prior chain, there are three non-cutting links between each pair of cutting teeth.

Another important advantage of this cutter tooth is that it may be sharpened by means of an ordinary flat file. It is only necessary to move the file over the flat outer surface on top 103 of the cutting element, to sharpen edges 94, 109 and 110, and across the flat end of face 108 thereof to sharpen cutting edges 94, 97 and 111. Similarly, a flat file moved over bevel surface 114 sharpens edges 115 and 116. The angles of these flat surfaces may be altered within the ranges set out above. As a rule, the angles are lessened for soft wood and increased for hard wood. Furthermore, the edges are less likely to be damaged in any way because of the bulk of the cutting element behind said edges, whereas with the prior teeth, there is only a thin piece of metal behind the curved and transverse cutting edges thereof.

It has been found that these cutter teeth move through the wood so comparatively easily that there is little, if any, tendency for the teeth to cock in the manner illustrated in FIGURE 4, in spite of the fact that they do not include depth gauges. It is felt that edges 109 and 110 help to prevent cocking. However, it has been found advantageous to so design the front and rear edges of the cutter teeth that the adjacent edges abut and prevent cocking while permitting the teeth to swing relative to each other sufficiently to move around the drive sprockets of the chain saws. In FIGURE 5, the rear edge of each tooth is formed with an undercut inclined surface or shoulder 125 which normally bears against a correspondingly-inclined surface or shoulder 126 on the forward edge of the body of the following tooth. It will be noted that these shoulders separate from each other at 127, which is located at or above the longitudinal centre line 128 extending through the rivets of the saw chain. This allows one cutter tooth to swing inwardly relative to the other, when the side connecting links swing inwardly. However, as long as the rivets of the chain remain on the centre line 128, no cutter can swing backwardly to tip its point 98 upwardly since shoulder 124 abuts against shoulder 126 of the following tooth.

Although good results are obtained by locating the cutting element anywhere along the outer edge of the body of the cutter tooth, it has been found that the best results are obtained when the point 98 of the cutting element is located no farther forwardly of the tooth than the forward rivet thereof. By referring to FIGURE 5, it will be seen that the point 98 of tooth 62 is located a little to the rear of the centre of rivet 69. The reason for these results is not clearly understood, but at least part of the reason may be that the point is located near the forward rivet where the outer end of depth gauge 45 of chain 10 in FIGURE 1 is located. In other words, the cutting element seems to act not only as a cutter, but somewhat as a depth gauge.

FIGURE 11 illustrates a cutter tooth 64a that is slightly different from tooth 64. Tooth 64a has a transverse cutting edge 132 that is curved rearwardly from leading point 98a and across the cutting element 85a. This makes the forward end 108a curved across the cutting element.

FIGURE 12 diagrammatically illustrates chain 60 extending around the outer curved end 138 of cutter bar 87. The chain is moved in the direction of arrow 139 around the bar by a power driven sprocket, not shown, at the opposite end of the bar in the customary manner. The purpose of notch 114 in the cutting element of each cutter tooth is illustrated in FIGURE 12. The chain saw is being used to bore into wood 141 in an endwise direction with reference to bar 87.

The angle of the inwardly inclined forward end 108 or angle 100 of tooth 62 and therefore the angles of outer and inner side cutting edges 97 and 111 are carefully set, as is the inward and rearward angle 105 of outer surface 103, for cutting along the bottom 143 of kerf 144 in wood 141. However, as soon as tooth 62 starts around the curved bottom 146 of the kerf, the critical angles of the cutting edges of the tooth are in effect altered relative to the curve kerf bottom. In addition to this, the portion 148 of the saw chain approaching the curved kerf bottom is pushed in that direction by the drive sprocket of the chain saw.

When the notch 114 of the cutter tooth 62b of FIG. 12 is omitted as is the case with standard chains, the forward drive of the portion 148 of the chain by the sprocket has a tendency to tip the cutter teeth forwardly as they start around the curved end 138 of the cutter bar. This has a tendency to drive the rear end of the cutting element into the wood, as indicated by lines 150 and 151 of tooth 62b. This creates considerable friction and heat with the consequent damage and waste of power. As the rear end of the cutting element engages the wood, this has a tendency to keep the cutting angles of the element the same around the curve as when the cutters are travelling in the straight portions of the kerf. As the wood is curving inwardly ahead of the transverse cutting edge of each tooth, the cutting angles are actually too great at this time, resulting in the tooth biting too deeply into the wood and causing chattering, further friction and waste of power. This chattering makes it impractical to attempt to bore with standard saw chains.

The formation of notch 114 in cutting element 80 eliminates the above difficulties. As indicated by the full lines of tooth 62b, the rear end of the cutting element is not pressed into the wood by the the drive sprocket. In addition to this, the notch permits the cutter tooth to tip forwardly a little as it starts around the curved end of the bar. This lessens the cutting angles of the tooth relative to the curved bottom 146 and thereby eliminates chattering during the boring operation. Thus chain 60 can be used to bore into wood without chatter, undue friction or waste of power.

Notch 114 is necessary in order to accomplish these results without affecting the operation of the saw chain. Cutting element must be relatively long in order to keep it moving straight forwardly through the kerf. If the element is shortened, there is a tendency for the element to wander laterally. The long cutting element provides long side faces that ride along the opposite walls of the kerf.

Brace 93 greatly adds to the strength of each of the present cutter teeth. Each cutting element is dragged through the wood by the thin flat body of its tooth so that there is a great strain between the element and body. Brace 93 greatly strengthens the connection between these parts and practically eliminates breakage at this connection.

What I claim as my invention is:

1. In a saw chain, a pair of longitudinally spaced and aligned cutter teeth pivotally secured together by a connecting link; each tooth comprising a substantially flat body having forward and rear edges with reference to the direction of movement of the teeth when in operation and an outer edge extending between said forward and rear edges, a long solid cutting element on and projecting from the body outer edge, said cutting element extending outwardly and spreading laterally on one side only of the body and extending forwardly from near the rear edge of the body towards the forward edge thereof and to a substantially transverse cutting edge located outwardly from the body, said cutting edge extending from a point outwardly of the body at one side of the body across the plane of said body to a leading point on the other side of the body spaced laterally therefrom, and a side cutting edge formed on the cutting element extending from said leading point generally inwardly towards the body and spaced laterally therefrom, the cutting element adjacent the transverse cutting edge being wide enough to project beyond a side of a cutter bar when the chain of which the tooth forms part is mounted on said bar, said cutting element having a flat surface on the outer end thereof forming laterally inner and outer edges extending longitudinally of said element at the sides thereof and rearwardly from the ends of the transverse cutting edge, said flat outer surface extending rearwardly from the transverse cutting edge and terminating short of the rear edge of the body to form a notch in the cutting element at the rearward end thereof, and said flat outer surface being inclined generally inwardly in a transverse direction from the outer longitudinal edge on the same side of the body as the side cutting edge thereof; said teeth being constructed with the side cutting edge of one tooth positioned on the opposite side of the chain from the side cutting edge of the other tooth, whereby the transverse cutting edges of the teeth overlap at the central longitudinal plane of the chain, said inner longitudinal edge extending coplanarly with a side of said flat body, each tooth being formed with its transverse cutting edge inclined rearwardly in a transverse direction from the leading point at its junction with the side cutting edge, the inner and outer longitudinal edges converging slightly rearwardly from the transverse cutting edge, and the flat outer surface being inclined rearwardly inwardly of the cutting element from the transverse cutting edge.

2. A saw chain as claimed in claim 1 in which the solid cutting element has a forward end extending inwardly and rearwardly at from 4° to 15° from the transverse cutting edge.

3. A saw chain as claimed in claim 1 including a brace between the flat body and the portion of the cutting element extending laterally therefrom.

4. A saw chain as claimed in claim 1 wherein said flat outer surface is inclined from 5° to 8° inwardly in a transverse direction from the outer longitudinal edge on the same side of the body as the side edge thereof, and said flat outer surface is inclined inwardly from 8° to 10° inwardly of the cutting element from said transverse cutting edge.

References Cited in the file of this patent

UNITED STATES PATENTS

| 2,485,962 | Entwisle | Oct. 25, 1949 |
| 2,564,989 | Ohman | Aug. 21, 1951 |
| 2,651,336 | Warren | Sept. 8, 1953 |
| 2,652,076 | Bye | Sept. 15, 1953 |
| 2,850,057 | Carlberg | Sept. 2, 1958 |

FOREIGN PATENTS

| 738,106 | Great Britain | Oct. 5, 1955 |
| 870,181 | Germany | Mar. 12, 1953 |
| 1,104,456 | France | June 15, 1955 |